United States Patent
Shapira et al.

(10) Patent No.: US 9,317,389 B2
(45) Date of Patent: Apr. 19, 2016

(54) APPARATUS AND METHOD FOR CONTROLLING THE RELIABILITY STRESS RATE ON A PROCESSOR

(71) Applicant: INTEL CORPORATION, Santa Clara, CA (US)

(72) Inventors: Dorit Shapira, Atlit (IL); Krishnakanth V. Sistla, Beaverton, OR (US); Efraim Rotem, Haifa (IL); Nadav Shulman, Tel Mond (IL); Shmulik Zobel, Hinanit (IL); Allen Chu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 109 days.

(21) Appl. No.: 13/931,115

(22) Filed: Jun. 28, 2013

(65) Prior Publication Data

US 2015/0006971 A1    Jan. 1, 2015

(51) Int. Cl.
*G06F 11/00*    (2006.01)
*G06F 11/30*    (2006.01)

(52) U.S. Cl.
CPC .......... *G06F 11/3024* (2013.01); *G06F 11/004* (2013.01); *G06F 11/008* (2013.01); *G06F 11/3058* (2013.01)

(58) Field of Classification Search
CPC ............ G06F 11/3024; G06F 11/3058; G06F 11/008; G06F 11/24; G06F 11/3428; G06F 11/3466
See application file for complete search history.

(56) References Cited

U.S. PATENT DOCUMENTS

| | | | |
|---|---|---|---|
| 3,246,242 A | 4/1966 | O'Hagan et al. |
| 5,844,917 A | 12/1998 | Salem et al. |
| 5,867,809 A | 2/1999 | Soga et al. |
| 6,134,675 A | 10/2000 | Raina |
| 6,908,227 B2 | 6/2005 | Rusu et al. |
| 7,146,292 B2 | 12/2006 | Rossi et al. |
| 7,183,799 B1 | 2/2007 | Donlin et al. |
| 7,313,706 B2 | 12/2007 | Williams et al. |
| 7,412,353 B2 | 8/2008 | Borkar |
| 7,472,038 B2 | 12/2008 | Bose et al. |
| 7,482,792 B2 | 1/2009 | Borkar |
| 7,493,477 B2 | 2/2009 | Velhal et al. |
| 7,495,519 B2 | 2/2009 | Kim et al. |
| 7,574,613 B2 | 8/2009 | Holle et al. |
| 7,616,021 B2 | 11/2009 | Papageorgiou et al. |
| 7,774,590 B2 | 8/2010 | Borkar |
| 7,774,625 B1 | 8/2010 | Sheng et al. |
| 7,779,287 B2 | 8/2010 | Lim et al. |
| 7,849,332 B1 | 12/2010 | Alben et al. |

(Continued)

FOREIGN PATENT DOCUMENTS

| | | |
|---|---|---|
| DE | 102 38 174 | 3/2004 |
| DE | 102 004 012 5 | 2/2005 |

(Continued)

*Primary Examiner* — Joseph Kudirka
(74) *Attorney, Agent, or Firm* — Nicholson De Vos Webster & Elliott

(57) ABSTRACT

An apparatus and method for tracking stress on a processor and responsively controlling operating conditions. For example, one embodiment of a processor comprises: stress tracking logic to determine stress experienced by one or more portions of the processor based on current operating conditions of the one or more portions of the processor; and stress control logic to control one or more operating characteristics of the processor based on the determined stress and a target stress accumulation rate.

21 Claims, 9 Drawing Sheets

(56) References Cited

U.S. PATENT DOCUMENTS

| | | |
|---|---|---|
| 7,886,164 B1 * | 2/2011 | Alben et al. .................. 713/300 |
| 7,917,328 B2 * | 3/2011 | Casey et al. .................. 702/132 |
| 8,064,197 B2 | 11/2011 | Mowry et al. |
| 8,094,706 B2 * | 1/2012 | Kim et al. ..................... 375/228 |
| 8,151,094 B2 * | 4/2012 | Vera et al. ..................... 712/220 |
| 2001/0021217 A1 | 9/2001 | Gunther et al. |
| 2003/0005380 A1 | 1/2003 | Nguyen et al. |
| 2003/0078741 A1 | 4/2003 | Storino |
| 2003/0110012 A1 | 6/2003 | Orenstien et al. |
| 2004/0123201 A1 | 6/2004 | Nguyen et al. |
| 2005/0125181 A1 | 6/2005 | Norman et al. |
| 2005/0144524 A1 | 6/2005 | Bonaccio et al. |
| 2005/0237319 A1 | 10/2005 | Ranganathan et al. |
| 2005/0240850 A1 | 10/2005 | Ohwada et al. |
| 2006/0015674 A1 | 1/2006 | Murotake |
| 2006/0015862 A1 | 1/2006 | Odom et al. |
| 2006/0114024 A1 | 6/2006 | Feng et al. |
| 2006/0171244 A1 | 8/2006 | Ando |
| 2006/0212269 A1 | 9/2006 | Lee et al. |
| 2007/0033425 A1 | 2/2007 | Clark |
| 2008/0126748 A1 | 5/2008 | Capps et al. |
| 2008/0263383 A1 * | 10/2008 | Knebel et al. ................. 713/501 |
| 2010/0214007 A1 | 8/2010 | Konstadinidis et al. |
| 2010/0268931 A1 | 10/2010 | Borkar |
| 2013/0054179 A1 * | 2/2013 | Shapira et al. ................ 702/117 |

FOREIGN PATENT DOCUMENTS

| | | |
|---|---|---|
| DE | 103 57 284 | 7/2005 |
| WO | WO00/65363 | 11/2000 |
| WO | WO2004/012131 | 2/2004 |
| WO | WO2005029329 | 3/2005 |
| WO | WO2006004875 | 1/2006 |
| WO | WO 2013/126066 A1 * | 8/2013 |

* cited by examiner

APPARATUS AND METHOD FOR CONTROLLING THE RELIABILITY STRESS RATE ON A PROCESSOR

BACKGROUND

In modern processors and other semiconductor devices, it is known that as the product ages, certain degradations become manifest. Several different phenomena can cause degradation to a semiconductor device, for example, hot-carrier injection, bias temperature instability, oxide breakdown (also known as time dependent dielectric breakdown (TDDB)), electro-migration and more. Each of these degradation mechanisms occurs due to various factors like temperature, voltage, current and others. For example, a frequency degradation occurs over a product's lifetime due to negative bias temperature instability (NBTI) degradation. This degradation becomes a reliability issue for p-channel metal oxide semiconductor (PMOS) and n-channel metal oxide semiconductor (NMOS) transistors. NBTI manifests itself as an increase in the threshold voltage and consequent decrease in drain current and transconductance. The degradation is caused by temperature and voltage applied to the product over time, where the temperature and voltage impact the degradation exponentially.

One manner of handling this issue is by applying a voltage/frequency guard band at a product's beginning of life (when the product is non-aged). However, this guard band limits performance for much of the useful life of the device. For example, maximum frequency ($F_{max}$) and minimum voltage ($V_{min}$) settings at a beginning of life (when the product is fresh) are set assuming end of life degradation (when the product is aged). As a result, there is a speed guard band as the frequency is set lower than a maximum rated frequency of the unit at a fixed voltage and/or the voltage is set higher than a minimum rated voltage of the unit at a fixed frequency.

No dynamic mechanism exists today to control the rate of aging in a semiconductor device. Consequently, static assumptions are made about the expected rate of aging, thereby causing an increase in operating voltage (as discussed above). It would therefore be beneficial to control the rate of aging (e.g., by controlling the operating conditions of the processor), to reduce operating guard bands without the need to set static limits.

DETAILED DESCRIPTION

Figure 1:
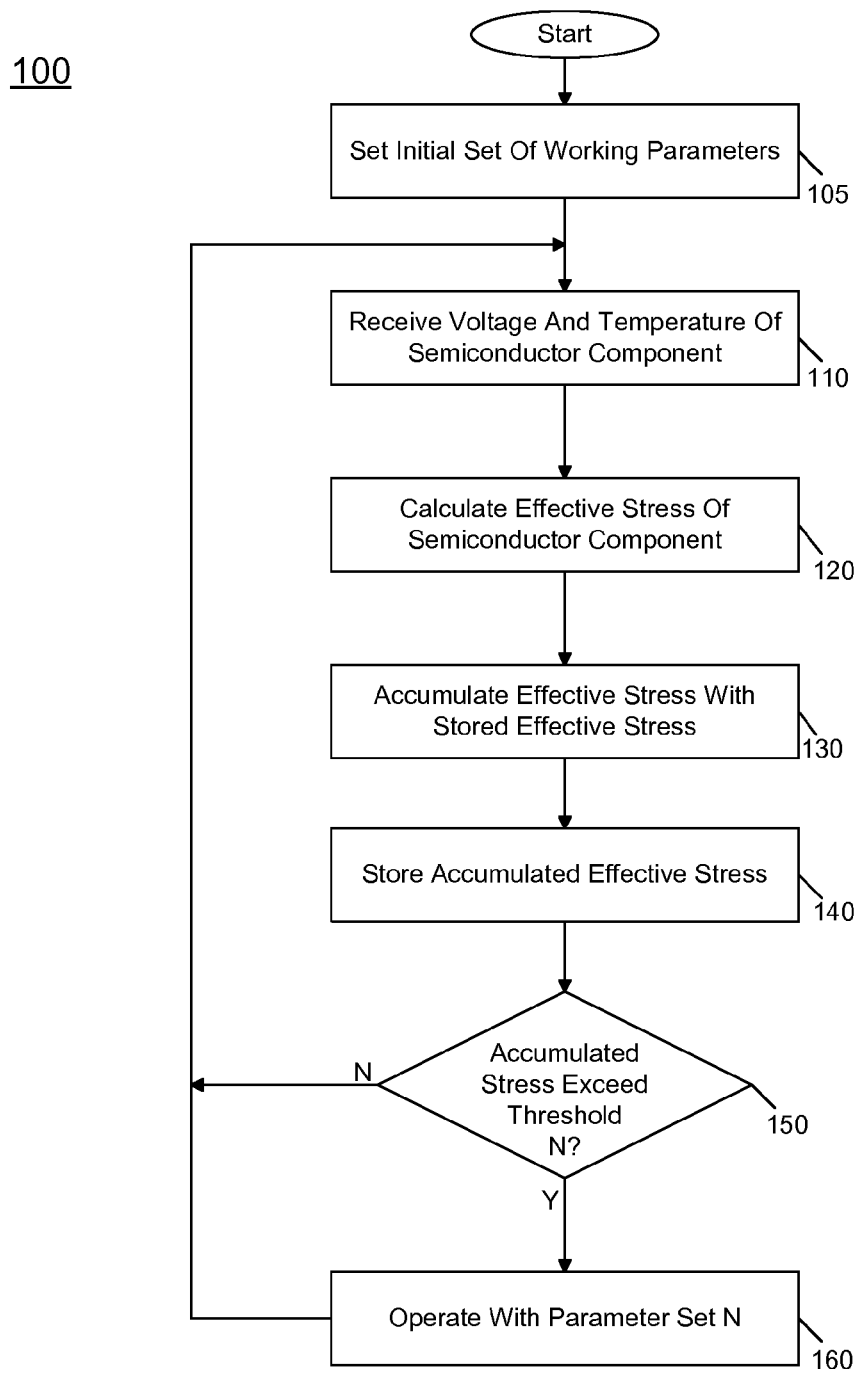
FIG. 1 is a flow diagram of a method in accordance with an embodiment of the present invention.

In various embodiments, an effective stress on a processor or other semiconductor device can be determined and used to control frequency/voltage or other settings at which the device operates. In this way, when there is low stress, e.g., when a product is relatively new, the product can operate at higher frequencies and/or lower voltages. As a result, it may be possible for a processor to gain multiple frequency bins, e.g., 1 or 2 turbo frequency bins at a beginning of its lifetime. Furthermore, since power is a square function of voltage, embodiments may enable running a processor at lower power to realize the same performance.

Although embodiments described herein are with regard to processors such as multicore processors including multiple cores, system agent circuitry, cache memories, and one or more other processing units, the scope of the present invention is not limited in this regard and embodiments are applicable to other semiconductor devices such as chipsets, graphics chips, memories and so forth. Also, although embodiments described herein are with regard to control of voltage/frequency settings, stress monitoring in accordance with an embodiment of the present invention can be used to control other device settings like maximum temperature, currents, and so forth.

To determine effective stress on the processor, a stress detector may be provided. In one embodiment, the stress detector can be implemented with a so-called reliability odometer. The reliability odometer may be used to track the temperature and voltage or other stress generating factors that the processor undergoes. As one example, the odometer can be implemented in logic of a power control unit (PCU) or other controller of the processor. From this information, the odometer may calculate an effective reliability stress that causes the degradation. The effective stress can be accumulated since a first powering on of the processor. When the processor is fresh (non-stressed) at a beginning of its lifetime, it can work with better performance and power efficiency, and without suffering from guard bands protecting against aging.

To maintain information regarding the effective stress, embodiments may further provide a non-volatile storage to accumulate the effective stress information ($S_{eff}$ data) over multiple boot and shutdown cycles. In one embodiment, a peripheral controller hub (PCH) may provide this non-volatile storage. And in such embodiments, the processor may read and write data to the PCH, e.g., using a vendor defined message (VDM) structure. In an alternate embodiment, a volatile memory (e.g., a RAM memory) is used to accumulate the effective stress information over multiple boot and shutdown cycles.

During processor operation, as the product ages due to the applied stress, embodiments may dynamically update voltage and frequency settings of the processor, graphics subsystem, memory, or any other subsystem or agent. In one embodiment, PCU logic may perform the stress calculations and trigger any appropriate changes in the product settings over time. However, at the beginning of processor lifetime, the settings of $V_{min}$ and $F_{max}$ can be at the maximum rated parameters.

The logic may be coupled to receive temperature and voltage inputs, and upon a change, the effective stress can be calculated, e.g., as an over time integral of $S_{eff}$, which is a function of voltage, temperature, current or any other stress generator. From this information, an effective stress can be calculated based on the physical functions that describe the stress impact on degradation. For example, NBTI stress is an exponential function of voltage and temperature, and the effective stress is an integral of the accumulated stress over time. Although the scope of the present invention is not limited in this regard, every time the temperature or voltage of the processor changes, the effective stress is re-calculated and accumulated with a value corresponding to the previously accumulated stress. When the value of this effective stress, which can be stored in a register, counter or other storage reaches a predefined threshold, the logic may implement a change in the voltage/frequency setting of the product. For example, a higher voltage may be provided to sustain the same frequency, or the processor may run at a lower frequency for a given voltage.

To provide for communication between the PCU and the PCH, an interconnect and logic may be present. Furthermore, embodiments may use fuses and registers on the processor to update settings, and can use a manageability engine to manage updates and reads to the non-volatile memory that stores the effective stress information, which can be in a flash memory of the PCH, in one embodiment. Alternatively, the device itself can include a non-volatile storage to store the accumulated stress value. In an alternate embodiment, a volatile memory such as a RAM memory is used to store the effective stress information.

Referring now to FIG. 1, shown is a flow diagram of a method in accordance with an embodiment of the present invention. As shown in FIG. 1, method 100 may be implemented within a power control unit or other controller, which may be a microcontroller, state machine or logic block of a processor or other semiconductor device. For purposes of illustration the discussion of FIG. 1 is in the context of a processor. Thus as seen at block 105, an initial set of working parameters can be set at the beginning of lifetime for that part. These working parameters can be of various operating parameters, such as nominal voltage for a given operating frequency, temperature, maximum current ($I_{ccmax}$) and so forth. These parameters may be the maximum available parameters for the given device, and can be set during manufacture of the device and stored, e.g., via fuses or non-volatile storage.

Control then passes to block 110, which occurs during normal operation, where a current voltage and temperature of the semiconductor component (e.g., processor) may be received. As one such example, these parameters may be received within the power control unit. Although only discussed with these two input parameters, understand the scope of the present invention is not limited in this aspect, and in other embodiments additional operating parameters such as activity factor, device loading, and transition time may also be received.

Method 100 continues by calculating an effective stress on the semiconductor component (block 120). More specifically, this effective stress may be calculated based on the received operating parameters. Different calculations can be performed based on the parameters received as well as the type of device and characterization information for the given type of device. Such calculations can be used to determine NBTI degradation, gate oxide degradation (TDDB), and interconnect degradation, as examples.

Control next passes to block 130 where the calculated effective stress can be accumulated with a stored effective stress, which may be stored in a non-volatile storage or a volatile storage. This updated effective stress value thus includes the newly calculated effective stress and a sum of previously determined effective stress values, e.g., from a beginning of the lifetime of the device, in this case a processor. This updated effective stress value then can be stored (block 140). As an example, this updated value can be stored back to the non-volatile/volatile storage from which the previously stored effective stress value was obtained.

Still referring to FIG. 1, next control passes to diamond 150 where it may be determined whether the accumulated effective stress value exceeds a given threshold value. As examples, multiple thresholds may be available, each corresponding to a given level of accumulated stress, e.g., corresponding to an approximate effective age of the device. As one such example, there can be N threshold levels, each approximately corresponding to a year's worth of device usage. While the scope of the present invention is not limited in this regard, each threshold value may be set at a level at which the effective stress has reached a point at which a corresponding degradation of performance is expected and thus certain measures may be initiated. If it is determined at diamond 150 that the given threshold has not been exceeded, control passes back to block 110 where a further iteration can be performed to again update the effective stress value, e.g., when a voltage or temperature change has been determined to have occurred.

For example, in the context of a processor and assuming a first (initial) threshold level is active, the processor may operate at least at its maximum rated frequency and at its minimum voltage level. Of course, because there is no degradation over the lifetime that the device has been operating, it can operate at a higher turbo mode frequency (of which there can be multiple bins made available by avoiding a guard band) depending on a load on the processor.

If instead the threshold level is exceeded, control passes to block 160 where a new parameter set may be selected for use so that the semiconductor component can be operated at a given parameter set. Thus if it is determined that the accumulated effective stress exceeds the threshold, the semiconductor component can be operated with degraded parameters. For example, the processor may be controlled to operate at less than a maximum rated frequency, and furthermore, in some embodiments the processor may operate at a higher than minimum voltage level. This control can be enabled by updating parameter settings, e.g., stored in a non-volatile storage, fuses or so forth.

As seen in the embodiment of FIG. 1 there can be multiple thresholds against which the accumulated effective stress is measured and when the value exceeds the given threshold, a different combination of operating parameters, e.g., degraded voltage and frequency levels can be used for the device settings. An indication of the appropriate threshold level to use for the analysis at diamond 150 can be stored, e.g., in a configuration register of the PCU. Although shown with this particular implementation in the embodiment of FIG. 1, understand the scope of the present invention is not limited in this regard.

Figure 2:
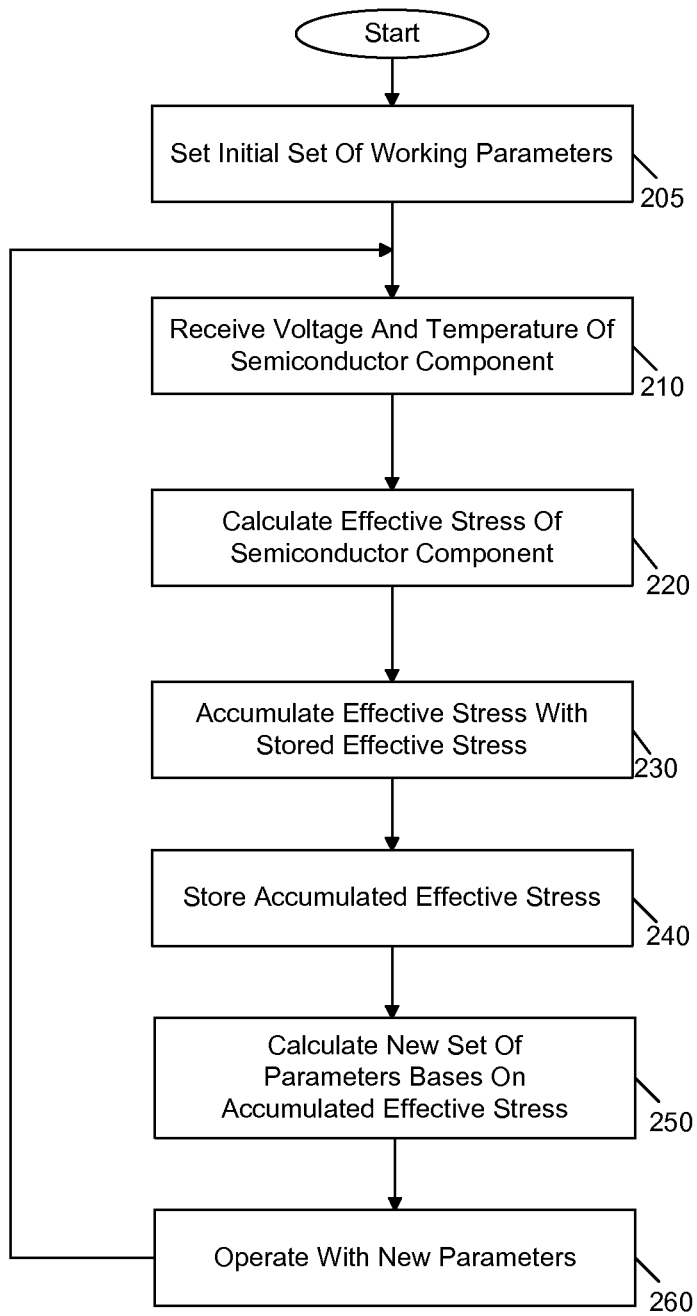
FIG. 2 is a flow diagram of another method in accordance with an embodiment of the present invention.

Referring now to FIG. 2, shown is a flow diagram of another method in accordance with an embodiment of the present invention. As shown in FIG. 2, method 200 is an alternate flow diagram for controlling and operating parameters of a processor based on an effective stress level of the processor. In general, method 200, which may similarly be performed by a stress detector of a PCU, may generally proceed as in FIG. 1. However, rather than comparing an accumulated effective stress to a threshold, instead this value is used to calculate new parameters that are then used for processor operation.

Specifically as seen in FIG. 2, at block 205 an initial set of working parameters can be set, as described above with regard to FIG. 1. Then during normal operation, voltage and temperature, in addition to potentially other operating parameters, may be received by the PCU (block 210). From this information, an effective stress can be calculated (block 220). In addition, this effective stress value can be accumulated with the stored effective stress (block 230) and this accumulated effective stress level can be stored (block 240), e.g., to a non-volatile storage of a PCH.

Referring still to FIG. 2, method 200 differs in that a new set of parameters for operating a processor can be calculated based on the accumulated effective stress (block 250). For example, in one embodiment the voltage and frequency at which the processor can operate can be calculated according to the Arrhenius equation, which represents temperature dependent aging, or other equations. Control thus passes to block 260 where the processor can be operated with these new calculated parameters. Although shown with this particular implementation in the embodiment in FIG. 2, understand the scope of the present invention is not limited in this regard.

Figure 3:
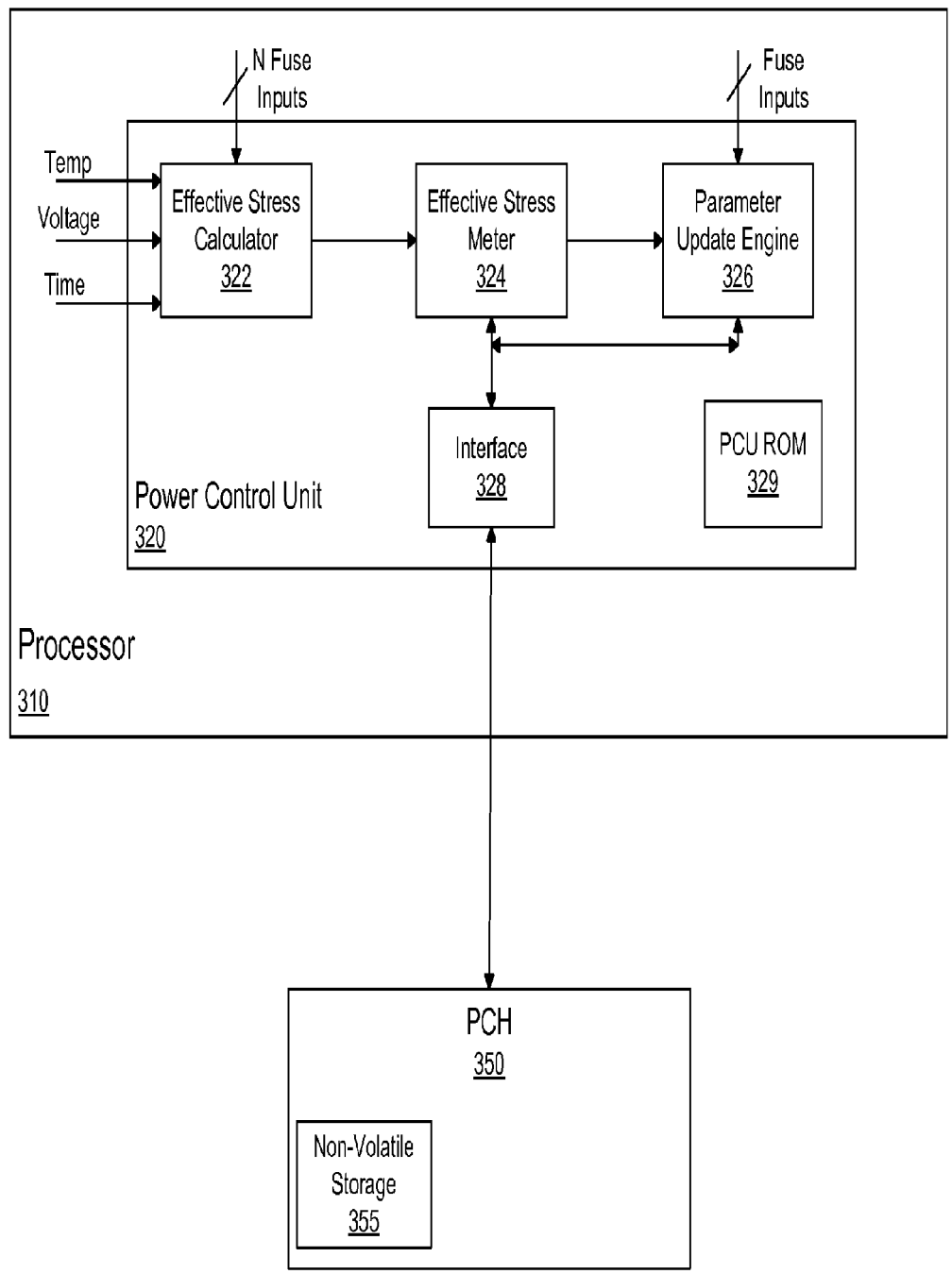
FIG. 3 is a block diagram of a portion of a system in accordance with an embodiment of the present invention.

Referring now to FIG. 3, shown is a block diagram of a portion of a system in accordance with an embodiment of the present invention. As shown in FIG. 3, system 300 includes a processor 310 that can be coupled to a PCH 350. Understand that processor 310 may be a multicore processor including multiple processor cores, cache memories and other components. However, for ease of illustration only a PCU 320 is shown. As seen, PCU 320 may include an effective stress calculator 322 that may receive incoming operating parameter information including temperature, voltage and time. In addition, various fused inputs can be received by the calculator. These fused inputs may be a set of constants and/or other coefficients. Based on these values and the incoming operating parameter information, stress calculator 322 can calculate an effective stress for the current parameters of the processor. This effective stress can then be accumulated with a stored effective stress value in an effective stress meter 324. As seen, stress meter 324 may be coupled to an interface 328 that in turn communicates with PCH 350, which as shown includes a non-volatile storage 355 that can store the accumulated effective stress value. Accordingly, stress meter 324 may perform an integration to thus accumulate the calculated effective stress from stress calculator 322 with the stored value from storage 355. This accumulated effective stress value can then be stored back to the non-volatile storage. In addition, as shown in FIG. 3, the accumulated effective stress level can be provided to a parameter update engine 326. As seen, update engine 326 may further receive a plurality of fused inputs, which may correspond to various coefficients and/or constants that can be used by the update engine to thus calculate one or more operating parameters based on the accumulated effective stress level.

As further seen in FIG. 3, PCU 320 may further include a read-only memory (ROM) 329 that may store code that can be executed by one or more of stress calculator 322, stress meter 324 and update engine 326. Generally, all of the components shown in PCU 320 thus may be considered to be a stress detector that can be implemented by any combination of logic including hardware, software, and/or firmware. Although shown at this high level in the embodiment of FIG. 3, understand that further components may be used to perform a stress analysis in accordance with an embodiment of the present invention.

Figure 4:
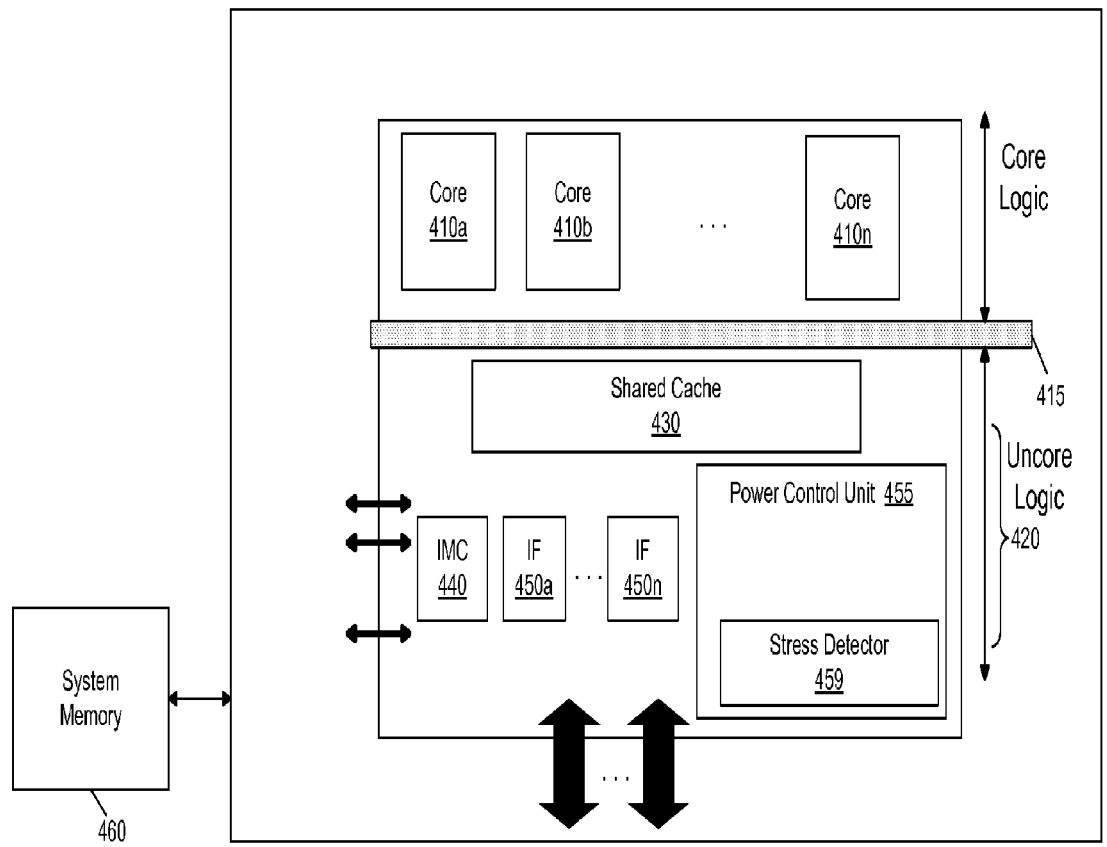
FIG. 4 is a block diagram of a processor in accordance with an embodiment of the present invention.

Referring now to FIG. 4, shown is a block diagram of a processor in accordance with an embodiment of the present invention. As shown in FIG. 4, processor 400 may be a multicore processor including a plurality of cores $410_a$-$410_n$. In one embodiment, each such core may be configured to operate at multiple voltages and/or frequencies, and to enter turbo mode when available headroom exists (and assuming the processor has not aged to a point at which a turbo mode is no longer available). The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may include a stress detector 459, which may be a logic to implement the effective stress analysis performed, e.g., in FIGS. 1 and 2. Accordingly, stress detector 459 may receive an input of current operating parameters and update an accumulated effective stress level based on a calculation for the current stress that the processor is undergoing. In addition, based on this analysis, PCU 455 may update one or more operating parameters of the processor.

With further reference to FIG. 4, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
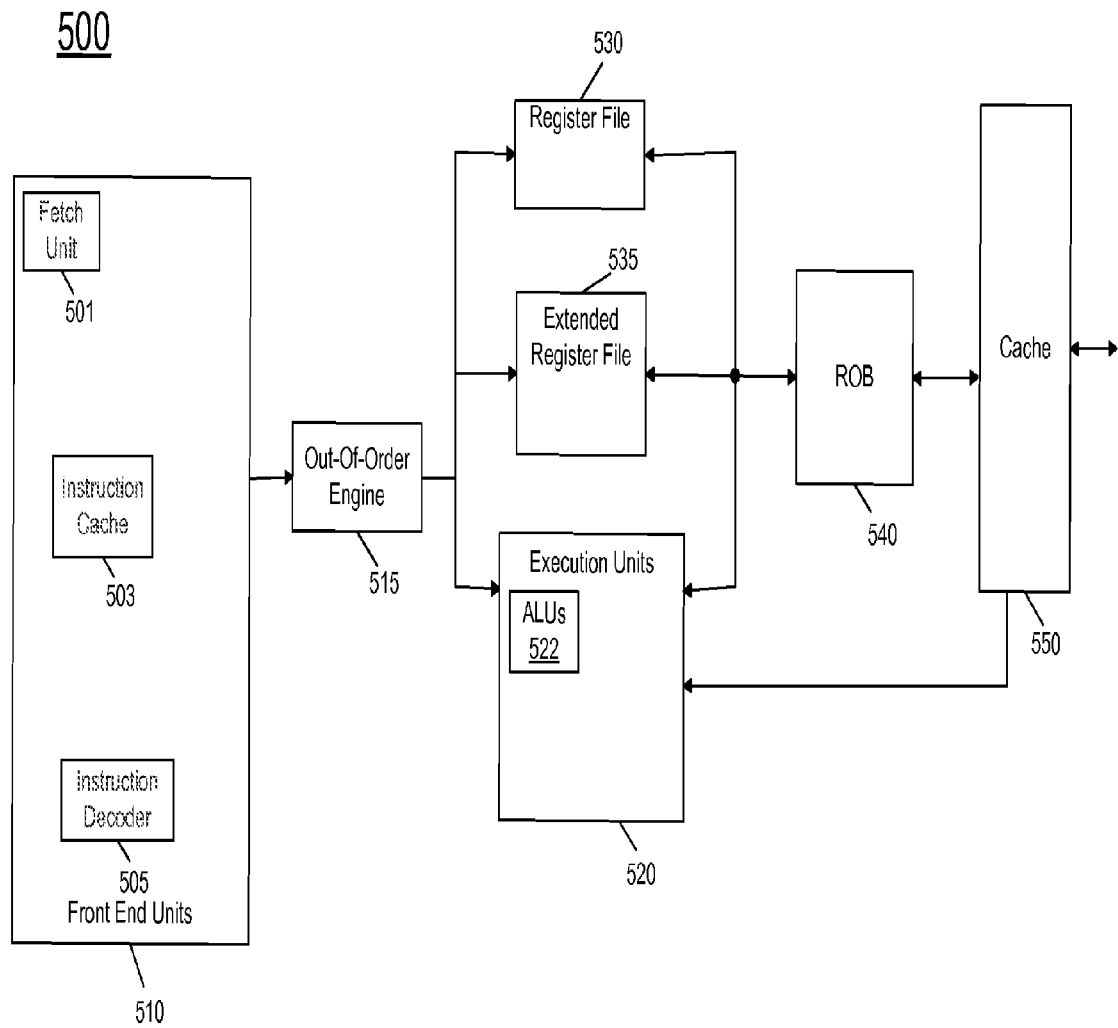
FIG. 5 is a block diagram of a processor core in accordance with one embodiment of the present invention.

Referring now to FIG. 5, shown is a block diagram of a processor core in accordance with one embodiment of the present invention. As shown in FIG. 5, processor core 500 may be a multi-stage pipelined out-of-order processor. As shown in FIG. 5, core 500 may operate at different voltages and frequencies (both in and out of turbo mode).

As seen in FIG. 5, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
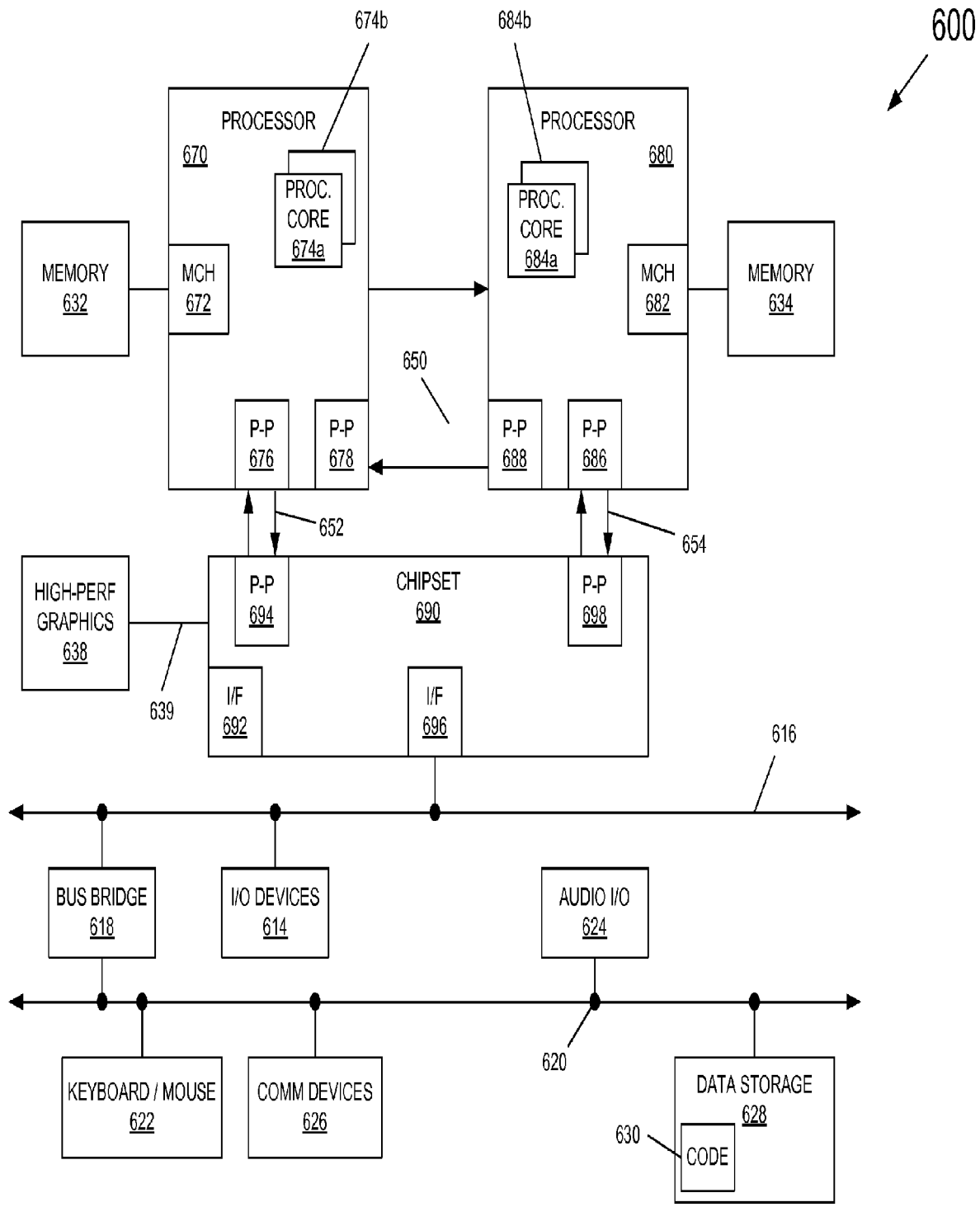
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to perform an effective stress analysis and control one or more operating parameters of the processor, as described herein.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, or so forth.

Apparatus and Method for Controlling the Reliability Stress Rate on a Processor

The embodiments described below control the rate of aging on a processor or other semiconductor device by dynamically limiting the operating conditions of the processor (e.g., frequency, voltage, temperature etc). With aging control and restriction, a certain level of aging can be assured, thereby gaining in product operating condition settings that were previously limited by static reliability assumptions.

As an example, voltage-based aging such as aging based on $V_{ccmin}$ may be controlled such that $V_{ccmin}$ of the processor will not raise above a predefined value. This reduces the required aging guard band, and increases the yield for very low power processors. It is well known that yield for processors which operate at extremely low power levels (e.g., cell phones, tablets, micro servers) are limited by $V_{ccmin}$. The embodiments described herein leverage the aging monitoring mechanism described above. In one embodiment, a closed loop control system is implemented on top of these embodiments. The resulting architecture is sometimes referred to herein as Reliability Stress Restrictor (R.S.R).

Stress causes semiconductor devices such as microprocessors to age. The stress may be caused, for example, by high temperature or high voltage over time. Electrical current may also be a cause of stress for some for some reliability phenomena. Some embodiments described herein implement a control loop to place a dynamic limit on the calculated stress rather than setting a static limit on each one of the components constructing the stress.

Figure 7:
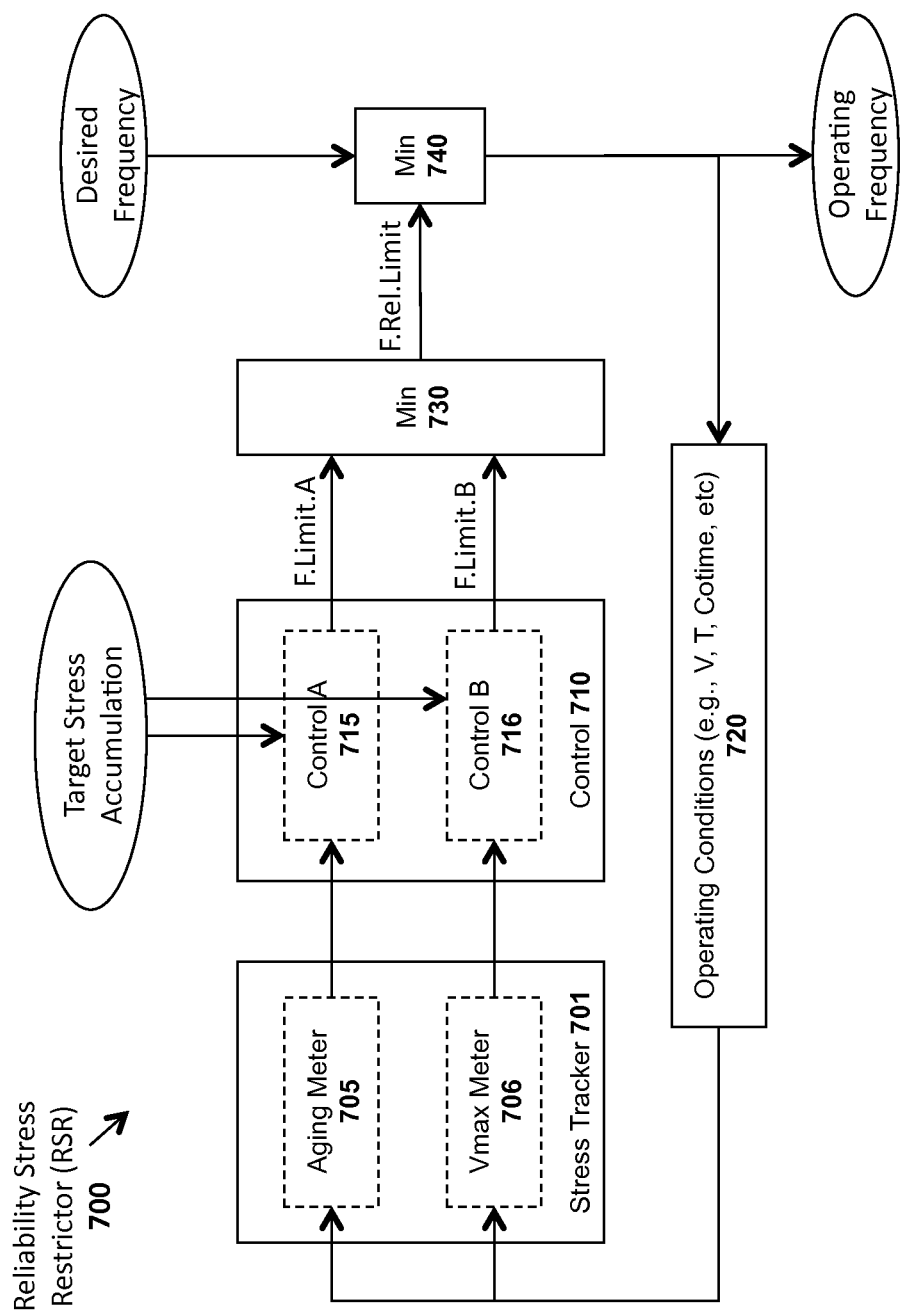
FIG. 7 is a block diagram of an architecture for controlling reliability stress rate on a semiconductor device.

FIG. 7 illustrates the components employed to implement the RSR 700 in one embodiment of the invention. In this embodiment, a stress tracker 701 tracks multiple (N) stress sources simultaneously. In the specific example shown in FIG. 7, an aging meter 705 tracks $V_{ccmin}$ aging stress and a $V_{max}$ meter tracks the accumulated time-dependent dielectric breakdown (TDDB) stress impacting $V_{max}$. It should be noted, however, that the underlying principles of the invention are not limited to any particular sources of stress. Alternate or additional sources of stress can be used or added as appropriate (e.g., for different microprocessor domains).

Control logic 710 receives tracked stress readings from the stress tracker 701 and responsively sets operating limits on the semiconductor device. In one embodiment, for N stress sources, N separate operating limits are specified. In the specific example shown in FIG. 7, the operating limits are operating frequency limits. However, the underlying principles of the invention are not limited to any specific type of operating limits. For example, alternate or additional limits such as operating voltage limits, current limits, and/or temperature limits may be specified.

In FIG. 7, the control logic 710 compares the rate of stress accumulation from the stress tracker 701 to one or more target stress accumulation rates. For example, control logic A 715 compares the rate of stress accumulation provided by aging meter 705 to a first target stress accumulation rate and control logic B 716 compares the rate of stress accumulation provided by $V_{max}$ meter 705 to a second target stress accumulation rate. The control logic 710 then performs a control action to cause the current rate to match the target rate. In the specific example shown in FIG. 7, control logic A 715 outputs a first frequency limit (F.Limit.A) and control logic B 716 outputs a second frequency limit (F.Limit.B). In one embodiment, the control is performed using proportional-integral-derivate (P.I.D.) control. However, the underlying principles of the invention are not limited to any particular control function.

The control action portion of the illustrated embodiment comprises first minimization logic 730 and second minimization logic 740 which work as described below to limit one or more of the variables that influences the rate of aging. In one embodiment, the maximum frequency allowed at any time is set by the first and second minimization logic, 730 and 740, respectively. Since frequency maps to operating voltage, this is one way to control aging stress. In one embodiment, by controlling and limiting operating frequency any time the target rate of stress accumulation is exceeded, the aging rate is set to the target rate. In one embodiment, the control function controls the time and duration in turbo mode (a high frequency, high performance mode used by some processors) to control the rate of aging.

Turning to the specific details shown in FIG. 7, the first minimization logic 730 selects the minimum of the first frequency limit (F.Limit.A) generated by control logic A 715 and the second frequency limit (F.Limit.B) generated by control logic B 716. The resulting frequency limit (F.Rel.Limit) is provided to the second minimization logic, which selects the minimum of F.Rel.Limit and a desired operating frequency (e.g., as specified by other control logic on the processor or semiconductor device).

The resulting operating frequency defines the current set of operating conditions of the processor 720 (e.g., different voltage, temperature, Cotime, etc, in different processor domains). The resulting operating conditions 720 are fed back to the stress tracker module 701 which, as discussed above, tracks multiple (N) stress sources simultaneously (e.g., from different domains or other portions of the processor). In one embodiment, the stress tracker 701 dynamically and continually tracks current operating conditions and provides the results to the control logic 710 which responsively compares the rate of stress accumulation (provided by each meter 705, 706) to target stress accumulation rate(s). The results are provided to the first minimization logic 730 as discussed in detail above.

Figure 8:
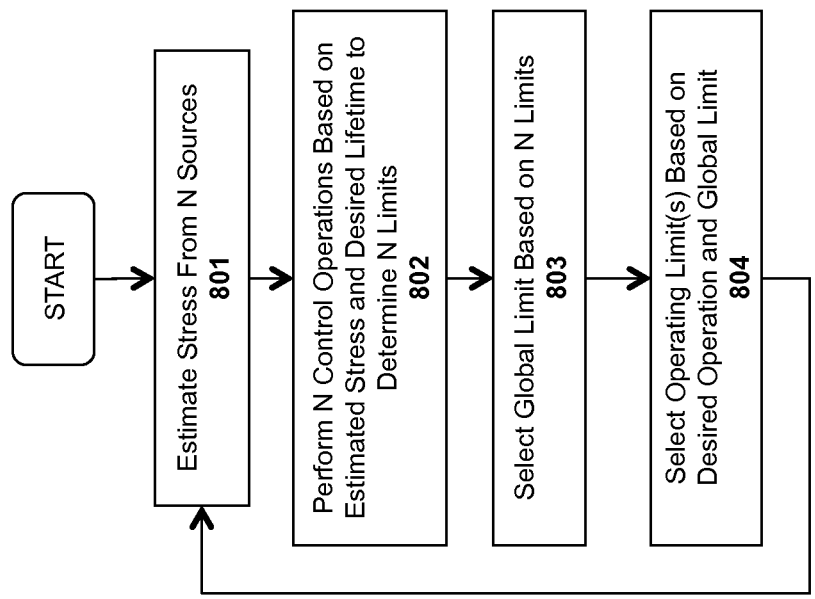
FIG. 8 is a flowchart of a method for controlling reliability stress rate on a semiconductor device.

FIG. 8 illustrates a method in accordance with one embodiment of the invention. This embodiment may be implemented within the context of the system shown in FIG. 7, but is not limited to any particular system configuration.

At 801, stress is estimated from N different sources within the semiconductor device. As mentioned above, the sources may include voltage, frequency, temperature, or other readings taken from different domains of a processor device. At 802, N control operations are performed based on the estimated stress from the N sources and the desired lifetime of the product to determine N limits (e.g., F.Limit.A and F.Limit.B in the example described above). At 803, a global limit is set based on the N limits. For example, in one embodiment, the minimum of the N limits is selected (e.g., F.Rel.Limit in the example above). At 804, the minimum of the global limit and a specified desired limit (e.g., a specified desired frequency) is selected to arrive at a current operating limit(s). The current operating limit may then be used to specify the current operating conditions of the semiconductor device (e.g., current voltage, frequency, temperature, etc).

While the embodiments described above focus on frequency control, it should be noted that other techniques may be employed such as voltage control and temperature control to control aging stress. For example, one control action is to increase the fan speed to reduce the temperature of the processor. The embodiments of the invention may perform any action that will reduce the sources of stress such as voltage, temperature and current (depending on which type of controlled stress is applicable).

One embodiment of the invention controls the amount of $V_{ccmin}$ degradation and the control function and controlling actions (as described above) are implemented in the power control unit (PCU) of the processor (e.g., in PCU firmware).

The embodiments described above provide significant benefits over current systems where the rate of aging is not controlled but is statically assumed upfront by QRE (quality and reliability engineers). The semiconductor operating conditions are constrained to ensure compliance with this assumption. For example, in these systems, Vmax and Tjmax are constrained by aging assumptions. The reliability guard band defined for $V_{ccmin}$ (lowest operating voltage) or on Fmax (highest operating frequency) is defined by the amount of aging predicted.

The embodiments described herein are introduce a method for controlling the rate of aging. By controlling the rate of aging, the semiconductor device settings can be improved (e.g., better $V_{ccmin}$ (with lower reliability Guardband) or higher Vmax or higher Tjmax, etc). Thus, instead of predicting the end of life for the product through an assumed rate of aging, in one embodiment, the rate of aging is controlled through a closed loop mechanism, thereby ensuring "aging certainty." Knowing the exact end of life duration for the product enables improved operating settings resulting in improved battery life and/or higher performance.

While some of the embodiments described above are implemented in PCU firmware, other implementations using the same concept are possible (e.g., drive, software, manageability firmware, etc).

Figure 9:
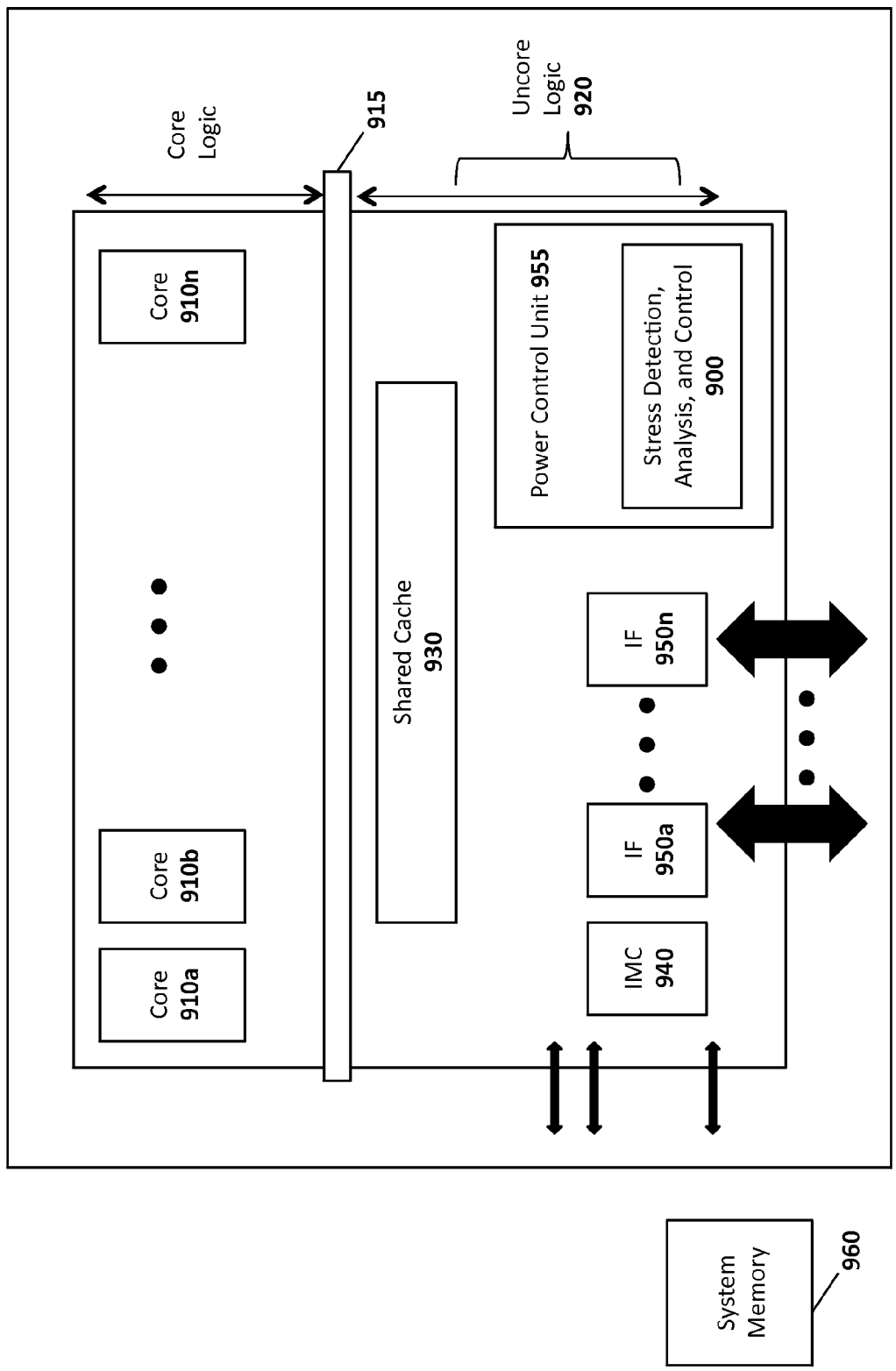
FIG. 9 illustrates a processor architecture in which embodiments of the invention may be implemented.

FIG. 9 illustrates a block diagram of a processor in accordance with an embodiment of the invention. As shown in FIG. 9, processor 900 may be a multicore processor including a plurality of cores $910_a$-$910_n$. In one embodiment, each such core may be configured to operate at multiple voltages and/or frequencies, and to enter turbo mode when available headroom exists (and assuming the processor has not aged to a point at which a turbo mode is no longer available). The various cores may be coupled via an interconnect 915 to a system agent or uncore 920 that includes various components. As seen, the uncore 920 may include a shared cache 930 which may be a last level cache (LLC). In addition, the uncore may include an integrated memory controller 940, various interfaces 950 and a power control unit 955.

In some embodiments, the power control unit 955 may include a stress detector and control logic 900, which may be a logic to implement the effective stress detection, analysis, and control as illustrated in FIGS. 7-8 and described above. Accordingly, the stress detection, analysis and control logic 900 may receive an input of current operating parameters and update an accumulated effective stress level based on a calculation for the current stress that the processor is undergoing. The stress detection, analysis and control logic 900 may then responsively set operating limits on the semiconductor device (e.g., as discussed above). In addition, based on this analysis, PCU 955 may update one or more operating parameters of the processor.

With further reference to FIG. 9, processor 900 may communicate with a system memory 960, e.g., via a memory bus. In addition, by interfaces 950, connection can be made to various off-chip components such as peripheral devices, mass storage and so forth. While shown with this particular implementation in the embodiment of FIG. 9, the scope of the present invention is not limited in this regard.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    stress tracking logic to determine stress experienced by one or more portions of the processor based on current operating conditions of the one or more portions of the processor; and
    stress control logic to control one or more operating characteristics of the processor based on the determined stress and a target stress accumulation rate;
    wherein the stress tracking logic includes a first meter to determine a first stress related to a first voltage and a second meter to determine an accumulated time-dependent dielectric breakdown (TDDB) stress related to a second voltage.

2. The processor as in claim 1 wherein the stress tracked by the stress tracking logic comprises an accumulated stress tracking logic which tracks a rate of stress accumulation experienced by the one or more portions of the processor.

3. The processor as in claim 1 wherein the stress tracking logic tracks stress for N portions of the processor, wherein N>1.

4. The processor as in claim 3 wherein the stress tracking logic outputs N different stress measurements, one for each of the N portions of the processor.

5. The processor as in claim 4 wherein the stress control logic determines N different limits on the operating characteristics, one for each of the N portions of the processor, the processor further comprising first minimization logic to determine a minimum of the N different limits.

6. The processor as in claim 5 further comprising second minimization logic to determine a minimum of a desired operating characteristic of the processor and the minimum of the N different limits determined by the first minimization logic.

7. The processor as in claim 1 wherein the operating characteristics of the processor comprise a frequency at which one or more of the portions of the processor operate.

8. The processor as in claim 1 wherein the first meter is to determine $V_{ccmin}$ stress and the second meter comprises a $V_{max}$ meter to determine an accumulated time-dependent dielectric breakdown (TDDB) stress impacting $V_{max}$.

9. The processor as in claim 1 wherein the stress control logic comprises a control loop feedback mechanism.

10. The processor as in claim 1 wherein the stress tracking logic and stress control logic are implemented with a power control unit (PCU) of the processor.

11. A method comprising:
    determining stress experienced by one or more portions of a processor based on current operating conditions of the one or more portions of the processor; and
    controlling one or more operating characteristics of the processor based on the determined stress and a target stress accumulation rate;
    wherein determining stress comprises determining a first stress related to a first voltage and determining an accumulated time-dependent dielectric breakdown (TDDB) stress related to a second voltage.

12. The method as in claim 11 wherein determining stress comprises tracking a rate of stress accumulation experienced by the one or more portions of the processor.

13. The method as in claim 11 wherein determining stress comprises determining stress for N portions of the processor, wherein N>1.

14. The method as in claim 13 further comprising outputting N different stress measurements, one for each of the N portions of the processor.

15. The method as in claim 14 further comprising determining N different limits on the operating characteristics, one for each of the N portions of the processor, the method further comprising determining a minimum of the N different limits.

16. The method as in claim 15 further comprising determining a minimum of a desired operating characteristic of the processor and the minimum of the N different limits.

17. The method as in claim 11 wherein the operating characteristics of the processor comprises a frequency at which one or more of the portions of the processor operate.

18. The method as in claim 11 wherein determining the first stress comprises determining $V_{ccmin}$ stress and determining the accumulated TDDB stress comprises determining an accumulated TDDB stress impacting $V_{max}$.

19. The method as in claim 11 wherein controlling one or more operating characteristics of the processor comprises a control loop feedback mechanism.

20. The method as in claim 11 implemented within a power control unit (PCU) of the processor.

21. A system comprising:
    a memory to store instructions and data;
    a cache having a plurality of cache levels to cache the instructions and data; and
    a processor comprising:
    stress tracking logic to determine stress experienced by one or more portions of the processor based on current operating conditions of the one or more portions of the processor, the current operating conditions based, at least in part, on the execution of the instructions and processing of the data; and
    stress control logic to control one or more operating characteristics of the processor based on the determined stress and a target stress accumulation rate;
    wherein the stress tracking logic includes a first meter to determine a first stress related to a first voltage and a second meter to determine an accumulated time-dependent dielectric breakdown (TDDB) stress related to a second voltage.

* * * * *